US012619300B2

(12) United States Patent
Vilermo et al.

(10) Patent No.: US 12,619,300 B2
(45) Date of Patent: May 5, 2026

(54) VIEWING DIRECTION

(71) Applicant: Nokia Technologies Oy, Espoo (FI)

(72) Inventors: Miikka Tapani Vilermo, Tampere (FI);
Lasse Juhani Laaksonen, Tampere
(FI); Arto Juhani Lehtiniemi, Tampere
(FI)

(73) Assignee: Nokia Technologies Oy, Espoo (FI)

( * ) Notice: Subject to any disclaimer, the term of this
patent is extended or adjusted under 35
U.S.C. 154(b) by 0 days.

(21) Appl. No.: 18/938,746

(22) Filed: Nov. 6, 2024

(65) Prior Publication Data

US 2025/0147579 A1     May 8, 2025

(30) Foreign Application Priority Data

Nov. 7, 2023     (GB) ..................................... 2317042

(51) Int. Cl.
*G06F 3/01*          (2006.01)
*G06V 40/20*        (2022.01)
(52) U.S. Cl.
CPC .............. *G06F 3/012* (2013.01); *G06F 3/013*
(2013.01); *G06V 40/28* (2022.01)
(58) Field of Classification Search
CPC .......... G06F 3/011; G06F 3/012; G06F 3/013;
G06F 3/017; G06F 3/0346; G06V 40/28;
H04N 21/44218; H04N 21/4728; H04N
21/816
See application file for complete search history.

(56) References Cited

U.S. PATENT DOCUMENTS

| | | | |
|---|---|---|---|
| 11,616,911 B2 | 3/2023 | Rodriguez et al. | |
| 11,954,247 B2 * | 4/2024 | Hashimoto | G06F 3/0346 |
| 2014/0140596 A1 * | 5/2014 | Kawaguchi | G06V 40/20 |
| | | | 382/128 |
| 2014/0347390 A1 * | 11/2014 | Poulos | G06F 3/011 |
| | | | 345/633 |
| 2016/0364904 A1 * | 12/2016 | Parker | G06F 3/038 |
| 2017/0083084 A1 * | 3/2017 | Tatsuta | G06F 3/147 |
| 2018/0075820 A1 * | 3/2018 | Hicks | G06F 3/14 |
| 2020/0241824 A1 | 7/2020 | Lee et al. | |
| 2020/0265604 A1 | 8/2020 | Lin et al. | |
| 2022/0129080 A1 * | 4/2022 | Yasuda | G02B 27/0093 |

(Continued)

FOREIGN PATENT DOCUMENTS

WO          2022/161840 A1     8/2022

OTHER PUBLICATIONS

Extended European Search Report received for corresponding European Patent Application No. 24205119.1, dated Jan. 21, 2025, 13 pages.

(Continued)

*Primary Examiner* — Mihir K Rayan
(74) *Attorney, Agent, or Firm* — McCarter & English LLP

(57)          ABSTRACT

The specification describes an apparatus comprising: means for determining a change in head direction of a user within a first predefined time period; means for determining a first predicted head direction based on said change in head direction; means for determining a change in torso direction of a user within a second predefined time period; and means for modifying the first predicted head direction to a second predicted head direction based, at least in part, on the change in torso direction.

18 Claims, 11 Drawing Sheets

(56) References Cited

U.S. PATENT DOCUMENTS

2023/0005167 A1    1/2023  Rodriguez et al.

OTHER PUBLICATIONS

Illahi et al., "Learning to Predict Head Pose in Remotely-Rendered Virtual Reality", Proceedings of the 14th ACM Multimedia Systems Conference, Jun. 7-10, 2023, pp. 27-38.
Sidenmark et al., "Eye, Head and Torso Coordination During Gaze Shifts in Virtual Reality", ACM Transactions on Computer-Human Interaction, vol. 27, No. 01, Dec. 2019, pp. 1-40.
Hou et al., "Head and Body Motion Prediction to Enable Mobile VR Experiences with Low Latency", IEEE Global Communications Conference (GLOBECOM), Dec. 9-13, 2019, 7 pages.
Chen et al., "Enhancing high-resolution 360 streaming with view prediction", Engineering at Meta, Apr. 19, 2017, 14 pages.
Weikert, "Predicting User's Head Motion in XR with a Gated Recurrent Unit based Model", Master's Thesis, Dec. 30, 2021, pp. 1-62.
Fang et al., "Eye-Head Coordination for Visual Cognitive Processing", Plos One, Mar. 23, 2015, pp. 1-17.
Search Report received for corresponding United Kingdom Patent Application No. 2317042.6, dated May 14, 2024, 5 pages.

* cited by examiner

Determine head direction with respect to a reference direction and head movement

51

Make a prediction of user head direction based on current head direction and head movement

52

Determine if torso has been recently rotated

53

Modify prediction towards torso movement direction

54

Use the prediction to allocate resources

55

50

VIEWING DIRECTION

RELATED APPLICATION

This application claims priority to United Kingdom patent application number 2317042.6, filed on Nov. 7, 2023, the content of which is incorporated herein by reference in its entirety.

FIELD

The present application relates to a predicted head direction in relation to video transmission.

BACKGROUND

Video transmission based on predicted head direction is known. There remains a need for improvement in this field.

SUMMARY

In a first aspect, this specification provides an apparatus comprising: means for determining a change in head direction of a user within a first predefined time period; means for determining a first predicted head direction based on said change in head direction; means for determining a change in torso direction of a user within a second predefined time period; and means for modifying the first predicted head direction to a second predicted head direction based, at least in part, on the change in torso direction.

In some examples, the change in head direction corresponds to a head movement degree of a movement of a user's head from in relation to a reference direction.

In some examples, the first predicted head direction is modified towards the direction of the change in torso direction for determining the second predicted head direction.

Some examples include means for allocating resources of a video for transmission via a network based, at least in part, on the second predicted head direction, wherein the resources comprise at least one of a bitrate or a resolution of the video.

In some examples, the allocating comprises allocating a higher amount of resources for transmission of one or more parts of the video corresponding to the second predicted head direction relative to an amount of resources for transmission of one or more other parts of the video.

In some examples, the video comprises at least one of an immersive video, a spherical video, a virtual reality video, a 360-degree video, or a 180-degree video.

In some examples, the modifying is performed based on a determination of whether the change in torso direction is higher than a first threshold.

Some examples include means for performing, if the first predicted head direction is more than ninety degrees relative to a reference direction: determining a first predicted torso direction based on the change in torso direction within a third predefined time period, wherein the second predicted head direction is determined further based on a combination of the first predicted head direction and the first predicted torso direction.

In some examples, at least one of the change in head direction and the change in torso direction is determined using one or more inertial measurement units (e.g. one or more of accelerometers, gyroscopes, and magnetometers).

In some examples, the second predicted head direction is further determined based on at least one of movement(s) of the user's leg(s) or movement(s) of the user's hand(s).

Some examples include: means for determining a difference between a current head direction and a current torso direction; means for, if said difference is larger than a first threshold, determining a gaze direction to be farther to a reference direction in comparison to the current head direction; means for, if said difference is smaller than the first threshold, determining the gaze direction to be closer to the reference direction in comparison to the current head direction.

Some examples include: means for determining a cursor direction based, at least in part, on the gaze direction.

Some examples include: means for enabling selection of user interface elements based, at least in part, on the cursor direction.

The means may comprise: at least one processor; and at least one memory including computer program code, the at least one memory and the computer program code configured, with the at least one processor, to cause the performance of the apparatus.

In a second aspect, this specification describes a method comprising: determining a change in head direction of a user within a first predefined time period; determining a first predicted head direction based on said change in head direction; determining a change in torso direction of a user within a second predefined time period; and modifying the first predicted head direction to a second predicted head direction based, at least in part, on the change in torso direction.

In some examples, the change in head direction corresponds to a head movement degree of a movement of a user's head from in relation to a reference direction.

In some examples, the first predicted head direction is modified towards the direction of the change in torso direction for determining the second predicted head direction.

Some examples may further comprise allocating resources of a video for transmission via a network based, at least in part, on the second predicted head direction, wherein the resources comprise at least one of a bitrate or a resolution of the video.

In some examples, the allocating comprises allocating a higher amount of resources for transmission of one or more parts of the video corresponding to the second predicted head direction relative to an amount of resources for transmission of one or more other parts of the video.

In some examples, the video comprises at least one of an immersive video, a spherical video, a virtual reality video, a 360-degree video, or a 180-degree video.

In some examples, the modifying is performed based on a determination of whether the change in torso direction is higher than a first threshold.

Some examples may further comprise: determining, if the first predicted head direction is more than ninety degrees relative to a reference direction, a first predicted torso direction based on the change in torso direction within a third predefined time period, wherein the second predicted head direction is determined further based on a combination of the first predicted head direction and the first predicted torso direction.

In some examples, at least one of the change in head direction and the change in torso direction is determined using one or more initial measurement units (e.g. one or more of each of accelerometers, gyroscopes, and magnetometers).

In some examples, the second predicted head direction is further determined based on at least one of movement(s) of the user's leg(s) or movement(s) of the user's hand(s).

Some examples may further comprise: determining a difference between a current head direction and a current torso direction; if said difference is larger than a first threshold, determining a gaze direction to be farther to a reference direction in comparison to the current head direction; if said difference is smaller than the first threshold, determining the gaze direction to be closer to the reference direction in comparison to the current head direction.

Some examples may further comprise determining a cursor direction based, at least in part, on the gaze direction.

Some examples may further comprise enabling selection of user interface elements based, at least in part, on the cursor direction.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: determining a change in head direction of a user within a first predefined time period;

determining a first predicted head direction based on said change in head direction;

determining a change in torso direction of a user within a second predefined time period; and modifying the first predicted head direction to a second predicted head direction based, at least in part, on the change in torso direction.

In a sixth aspect, this specification describes a computer-readable medium (such as a non-transitory computer-readable medium) comprising program instructions stored thereon for performing at least the following: determining a change in head direction of a user within a first predefined time period; determining a first predicted head direction based on said change in head direction; determining a change in torso direction of a user within a second predefined time period; and modifying the first predicted head direction to a second predicted head direction based, at least in part, on the change in torso direction.

In a seventh aspect, this specification describes an apparatus comprising: at least one processor; and at least one memory including computer program code which, when executed by the at least one processor, causes the apparatus to: determine a change in head direction of a user within a first predefined time period; determine a first predicted head direction based on said change in head direction; determine a change in torso direction of a user within a second predefined time period; and modify the first predicted head direction to a second predicted head direction based, at least in part, on the change in torso direction.

In an eighth aspect, this specification describes an apparatus comprising: a first module configured to determine a change in head direction of a user within a first predefined time period; a second module configured to determine a first predicted head direction based on said change in head direction; a third module configured to determine a change in torso direction of a user within a second predefined time period; and a fourth module configured to modify the first predicted head direction to a second predicted head direction based, at least in part, on the change in torso direction.

DETAILED DESCRIPTION

Figure 1:
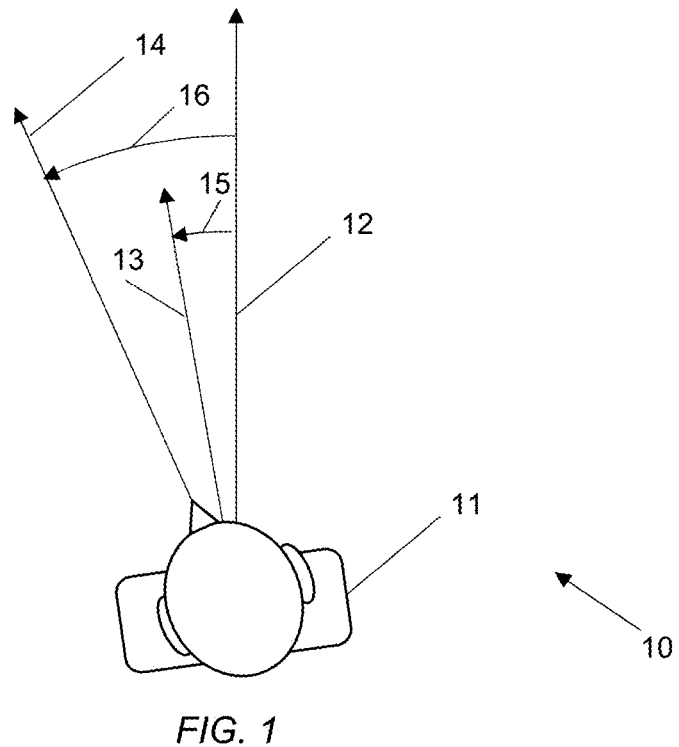
FIGS. 1 and 2 are block diagrams of systems in accordance with example embodiments.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Video transmission, such as streaming videos, may require a high amount of data resources. Streaming multi-dimensional videos, such as 360-degree videos, immersive videos, virtual reality videos, 180-degree videos, or any video comprising content that is wider than the field of view of a viewing device or user eye, may require high amount of bits, transmission of which may use high bandwidth, which may be expensive and may cause network problems. The overall resources used for video transmission may be reduced by allocating higher amount of resources (e.g. higher bitrate, higher resolution, and/or higher number of bits) to areas that a user is viewing and is most likely to be viewing in the future (e.g. viewport-dependent coding), and lower amount of resources to areas that the user is not likely to be viewing. As such, it may be useful to predict the user's future head direction, in order to allocate bits efficiently. In some examples, a decision as to which part of the video the higher amount of resources (e.g. higher bitrate, higher resolution, and/or higher number of bits) should be allocated to, may need to be made at least a few seconds (e.g. 10 seconds) before the user actually changes viewing direction in order to account for network delays and buffering. The example embodiments described below provide techniques for predicting future head/gaze direction in order to efficiently allocate bits in streaming video.

FIG. 1 is a block diagram of a system, indicated generally by the reference numeral 10, in accordance with example embodiments. System 10 shows a user 11, for example, who may be viewing a video, such as a streaming video (e.g. 360-degree videos, immersive videos, virtual reality videos, 180 degree videos). An example reference direction is shown as the reference direction 12. Current torso direction of the user 11 is shown by current torso direction 13, and current head direction of the user 11 is shown by the current head direction 14. The reference direction 12 may be considered to be an initial direction where the user 11 may be looking towards. From the reference direction 12, a user 11 may turn their head, as shown by the change in head direction denoted by arrow 16. The user 11 may additionally or alternatively turn their torso, as shown by the change in torso direction denoted by arrow 15.

In some examples, in the event that a user 11 plans to change head (e.g. gaze) direction by a significant amount, it may be likely that the user 11 turns their torso prior to changing head or gaze direction, as it may then be easier for the user 11 to view part(s) of the video that may be significantly offset from the reference direction 12 (due to a normal range of head movement being not more than 90 degrees on each side of the user). Change in head direction or gaze direction may only reach large rotations (>50 degrees) when there is also torso movement before gaze direction reaches large rotations. The torso movement may be minimal but detectable, and may be an indication of upcoming significant change in head/gaze direction. Some of the example embodiments below describe how to predict a future head direction based, at least in part, in the change in torso direction.

Figure 2:
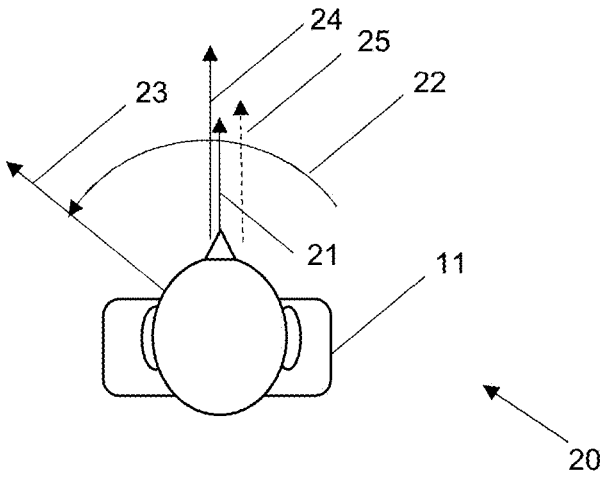

FIG. 2 is a block diagram of a system, indicated generally by the reference numeral 20, in accordance with an example embodiment. System 20 shows the user 11 who has a current head direction 21 (i.e. the user 11 is currently looking towards the direction 21). In system 20, the torso of user 11 is directed towards current torso direction 24, which is shown to be same as the current head direction 21. The current head direction may be a first movement degree offset from a reference direction, such as the reference direction 25. As an example, system 20 shows the current head direction 21 and the current torso direction 24 to be the same as the reference direction 25. Based, at least in part, on the current head direction 21 and the current torso direction 24, the user may be predicted to move their head in the direction shown by arrow 22, and a first predicted head direction may be the direction 23.

Figure 3:
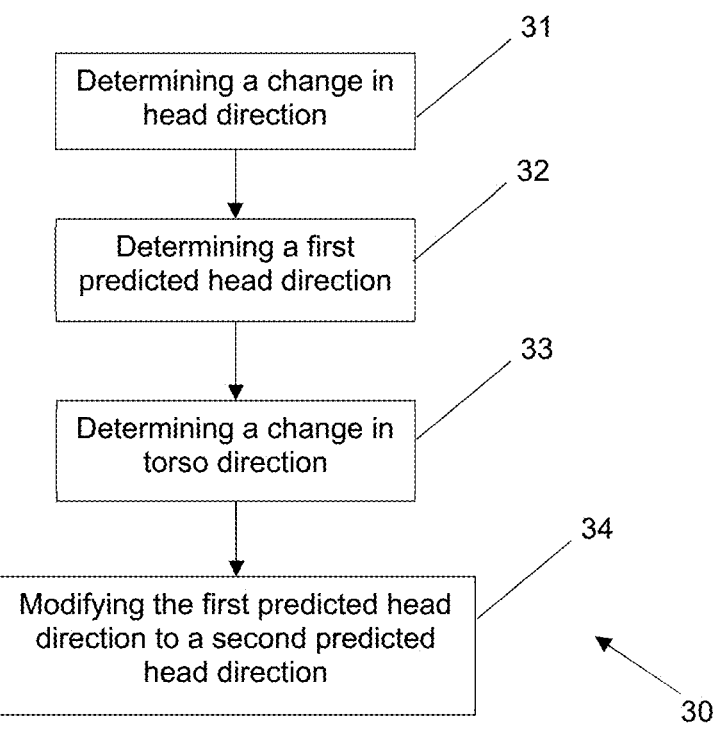
FIG. 3 is a flowchart of an algorithm in accordance with an example embodiment.

FIG. 3 is a flowchart of an algorithm, indicated generally by the reference numeral 30, in accordance with an example embodiment. FIG. 3 may be viewed in conjunction with FIG. 4 for better understanding of the examples.

Figure 4:
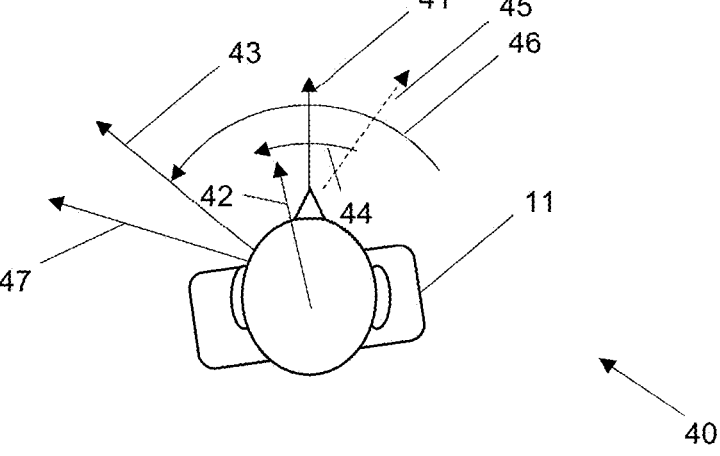
FIG. 4 is a block diagram of a system in accordance with an example embodiment.

FIG. 4 is a system, indicated generally by the reference numeral 40, in accordance with an example embodiment. System 40 comprises a user, such as the user 11, and shows a reference direction 45. The user 11 has a current head direction 41 and a current torso direction 42. The change in torso direction is shown by the arrow 44. It may be appreciated that the current head direction may or may not be same as the reference direction 45. System 40 further shows a first predicted head direction 43 (e.g. user 11 is predicted to move their head as shown by arrow 46), and a second predicted head direction 47.

The algorithm 30 may start with operation 31, which comprises determining a change in head direction (e.g. relating to the head direction of user 11) within a first predefined time period. The change in head direction may correspond to a head movement degree of a movement of the user's head in relation to a reference direction. For example, referring to system 40 of FIG. 4, the change in head direction may be determined based on the difference in angle of current head direction 41 and the reference direction 45 (e.g. the user 11 may have changed their head direction from the reference direction 45 to the current head direction 21 within the first predefined time period).

Next, the algorithm moves to operation 32, which comprises determining a first predicted head direction 43 based, at least in part, on the change in head direction. For example, if the user 11 changes their head direction towards the left from reference direction 45 within the first predefined time period (e.g. within the past two seconds, the user 11 may be predicted to change their head direction further towards the left in the next few seconds In some examples, the prediction of the first predicted head direction may further be based on the content of the video (e.g. if the video has, towards the left, a continuity of content, or user interface elements that the user is likely to interact with, the user may be likely to change head direction further towards the left).

Next, at operation 33, a change in torso direction of the user (e.g. user 11) within a second predefined time period is determined. The change in torso direction may correspond to a torso movement degree of a movement of the user's torso in relation to the reference direction (e.g. reference direction 45). System 40 shows the change in torso direction to be higher than the change in head direction, such that the user's torso is not in the same direction as the user's head.

At operation 34, the first predicted head direction 43 may be modified to a second predicted head direction 47 based, at least in part, on the change in torso direction. For example, as the user turned not only their head, but also their torso, it may be predicted that the user intends to change head direction farther than was predicted in the first predicted head direction (e.g. as torso movement may then make it easier for the user 11 to view part(s) of the video that may be significantly offset from the reference direction 45 due to a normal range of head movement being not more than 90 degrees on each side of the user).

In an example embodiment, the first predicted head direction 43 is modified by a certain angle towards the change in torso direction 44 for determining the second predicted head direction 47. Therefore, the second predicted head direction 47 is farther left from the reference direction 45 compared to the first predicted head direction 43.

In some examples, the reference direction may be updated iteratively, for example, such that the current head direction in a first iteration becomes a reference direction in a second iteration, and so on.

In some examples, resources of a video (e.g. the video being viewed by the user 11), for transmission via a network, may be allocated based, at least in part, on the second predicted head direction 47. The resources of the video may include one or more of a bitrate or resolution of the video, or number of transmission bits. For example, a higher amount of resources (e.g. higher bitrate, higher resolution, and/or higher number of transmission bits) may be allocated for transmission of one or more parts of the video corresponding to the second predicted head direction 47 relative to an amount of resources (e.g. bitrate, resolution, and/or number of bits) for transmission of one or more other parts of the video.

In some examples, the modifying of operation 34 may be performed based on a determination of whether the change in torso direction is higher than a first threshold. For example, if the torso is moved more than the first threshold (e.g. more than 10 degrees), it may be determined that the prediction of future head direction should be based on change in head direction as well as the change in torso direction, and consequently the first predicted head direction is modified to the second predicted head direction 47 based on the change in torso direction.

Figures 5, 6:
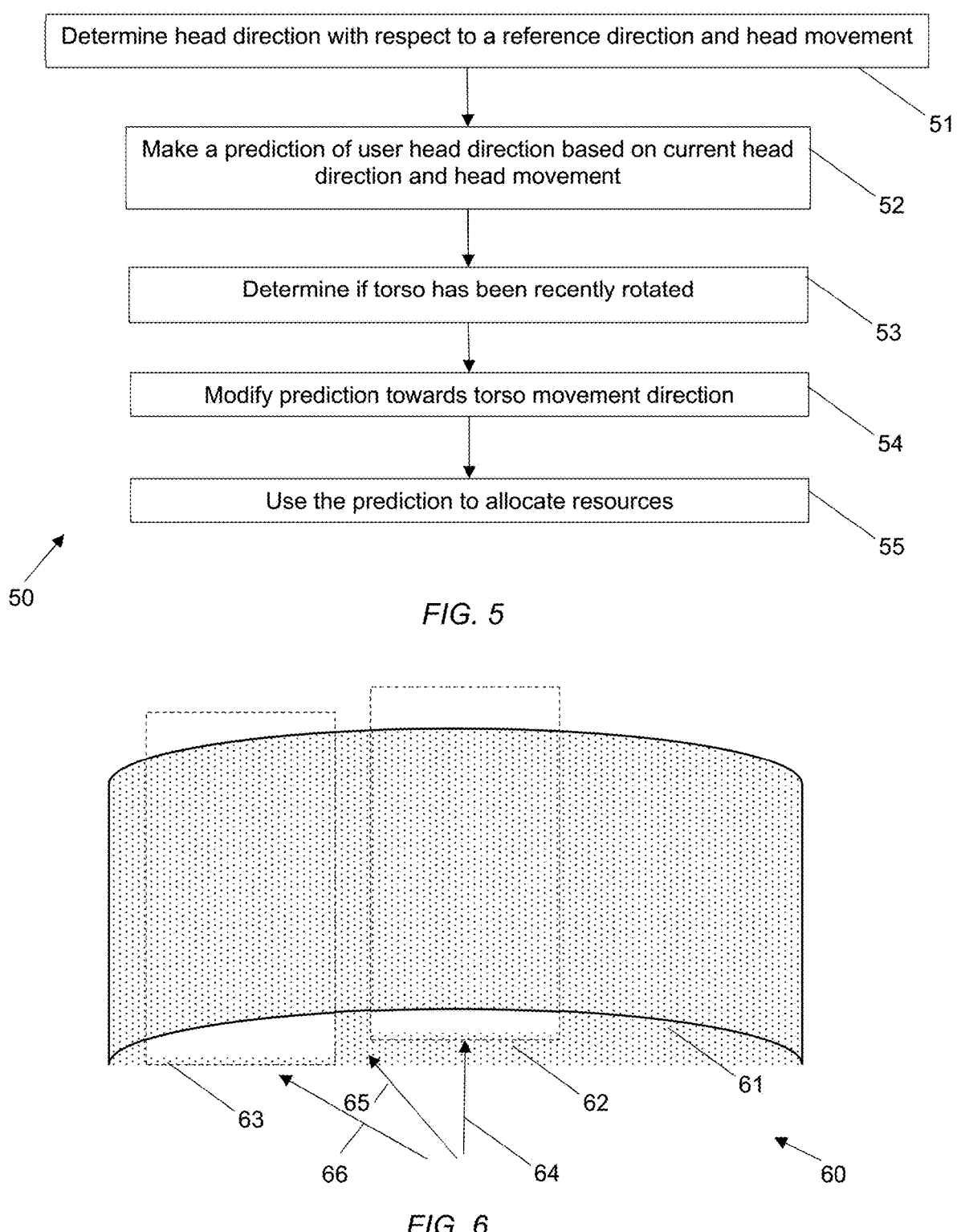
FIG. 5 is a flowchart of an algorithm in accordance with an example embodiment.
FIG. 6 is a block diagram of a system in accordance with an example embodiment.

FIG. 5 is a flowchart of an algorithm, indicated generally by the reference numeral 50, in accordance with an example embodiment. FIG. 5 may be viewed in conjunction with FIG. 4 for better understanding.

At operation 51, a current head direction 41 of a user 11 may be determined with respect to a reference direction 45 and a head movement (e.g. speed and/or degree of head movement) of the user 11 from the reference direction 45 to the current head direction 41. Next, at operation 52, a prediction of user head direction, such as the first predicted head direction 43, is determined, based on the current head direction 41 and the head movement (e.g. speed and/or degree of head movement). At operation 53, it is determined whether the torso of user 11 has been moved recently, for example, within a first predefined time period. In the event that the torso has been moved, the prediction of operation 52, for example the first predicted head direction 43, may be modified to be further towards the change in torso direction 44. As such, the modification may provide the second predicted head direction 47, which is further towards the torso movement direction (further left) from the current head direction/reference direction, in comparison to the first predicted head direction 43. Next, at operation 55, the prediction of the second predicted head direction 47 may be used for allocating resources of a video (e.g. video being viewed by the user 11).

In some example embodiments, prediction of future head direction (and consequently allocation of resources of a video) may further be based, at least in part, on a velocity vector of change in head/gaze direction (e.g. speed at which the user is moving their head/gaze), and one or more spatial and/or temporal points of interest within the video (i.e. points of interest in within the space of the video and/or points of interest within the time frame of the video). As discussed in the above examples, if the torso is stationary (i.e. there is no change in torso direction within a predefined time period), the resources may be allocated based on the change in head direction and points of interest. Alternatively, if the torso moves (i.e. there is a change in torso direction within the predefined time period), then higher amount of resources (e.g. higher bitrate, higher resolution, and/or higher number of bits) may be allocated further in the torso movement direction as the predicted future head/gaze direction may be farther towards the direction of torso movement.

FIG. 6 is a block diagram of a system, indicated generally by the reference numeral 60, in accordance with an example embodiment. System 60 shows an illustration of a video 61 (e.g. a 360-degree video), having a plurality of spatiotemporal parts, such as parts 62 and 63. For example, a viewer (e.g. user 11) may only be able to view part(s) of the video 61 that fit in their field of view (e.g. video 61 may be a 360-degree video such that all parts of the video 61 may not be viewable to the viewer at any given time due to the limitations of their field of view). The viewer may have a current head direction 64, such that the part 62 of the video 61 may be viewed by the viewer. In order to allocate resources efficiently for the viewer's next (at least one) viewing direction, the viewer is predicted to view the video 61 towards a first predicted head direction 65 (e.g. determined at operations 32, 52). In the event that a torso movement is detected (e.g. determined at operations 33, 53), the prediction may be modified (e.g. operations 34, 54) to a second predicted head direction 66, such that higher amount of resources are allocated (e.g. operation 55) to the part 63 of the video 61.

In some examples, allocation of resources, may generally be understood as selection of angles with high-quality video versus selection of angles with low-quality video, such that angles that are significantly farther from a current head direction and/or a reference direction may be selected for high-quality video where a change in torso direction is observed. The predicted future head direction may be modified while, for example, maintaining a default chosen bit allocation between the high-quality and low-quality views (e.g. certain areas of the video may be determined to be less in focus by default, while certain areas may be determined to be more important regardless of the user's head direction). In some examples, higher amount of resources may be transmitted for making high-quality view in at least one direction, where the higher bit allocation may be maintained, or, for example the higher bit allocation towards the predicted future head direction may be temporary.

In one example, at least one of the change in head direction and the change in torso direction is determined (e.g. operations 32, 33, 52, 53) using one or more inertial measurement unit(s) (IMU(s)). The IMUs may comprise one or more of accelerometers, gyroscopes, and/or magnetometers. For example, the IMU(s) may be a part of a head mounted device (e.g. smart glasses, virtual reality headset, or the like). In one example, head movement and/or torso movement may be determined separately using said IMU(s). Alternatively, or in addition, a difference between the head direction and torso direction may be used for determining a relative torso direction. The difference between the head direction and torso direction may be determined using camera(s), for example, of a head mounted device, that may point down towards to capture torso movements. As such, the torso direction may be used for determining torso movement(s) (e.g. change in torso direction), and a difference between the torso direction and head direction may also be calculated for determining head movement(s) (e.g. change in head direction). Alternatively, an external camera (e.g. not part of a device worn by the user, such as a camera fixed on a computer, gaming device, or other type of devices) may be used for determining head direction and/or movement, and torso direction and/or movement.

In an example embodiment, the reference direction (25, 45) may be determined by the head mounted device. For example, the reference direction may be a "zero" direction or "front" direction in the 360-degree video.

In some examples, in addition to predicting future head direction, a future gaze direction may also be determined. For example, determining a current gaze direction may be performed using a camera (e.g. within the head mounted device) looking at eyes of the user. The future gaze direction may be determined based one or more of the current gaze direction, current head direction, change in head direction, and change in torso direction. The current gaze direction may allow more accurate determination of the predicted future head direction for efficient allocation of resources of the video.

In some examples, a 360-degree video may be divided into at least two regions that have different bit allocations. A first region may have lower bit allocation and a second region may have higher bit allocation. When there is no movement of the user's torso, the second region (higher bit allocation) may be predicted to be in a direction where user gaze/head direction is predicted to be based on current gaze/head direction and head movement by predicting a trajectory for the head/gaze movement using methods such as linear prediction. However, when user torso has moved, and a change in torso direction is detected, then the prediction result is moved further than the linear prediction result. For example, the first predicted future head direction could be modified towards the direction of the torso movement, where the modification might comprise increasing the predicted head movement degree by a first number (e.g. 1 to 5) of degrees for every degree of change in torso direction.

In an example embodiment, the second predicted head direction is further determined based on at least one of movement(s) of the user's leg(s) or movement(s) of the user's hand(s). For example, movement of user's leg(s) or hand(s) in a certain direction may indicate initiation of torso and/or head movement.

Figure 7:
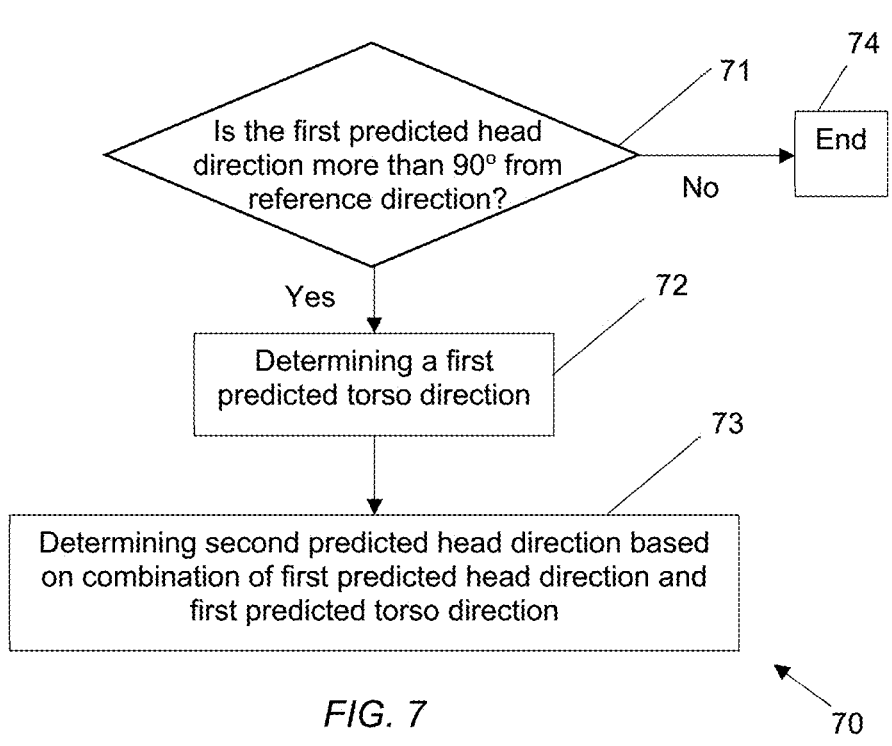
FIGS. 7 to 9 are flowcharts of algorithms in accordance with example embodiments.

FIG. 7 is a flowchart of an algorithm, indicated generally by the reference numeral 70, in accordance with an example embodiment. The algorithm 70 may be performed after the operation 32 of algorithm 30, and may start at operation 71, where it is determined whether the first predicted head direction (determined at operation 32) is more than 90 degrees from a reference direction. If the first predicted head direction is determined to be more than 90 degrees from the reference direction, the algorithm moves to operation 72, where a first predicted torso direction is determined. For example, the first predicted torso direction may be determined based on: a change (e.g. direction, speed, and/or amount of change) in torso direction within a second predefined time period. Next, at operation 73 (may be performed instead of operation 34), the second predicted head direction may be determined based on a combination of the first predicted head direction and the first predicted torso direction. The algorithm 70 may end at operation 74 and move to operation 33 of the algorithm 30 in the event that the first predicted head direction is not more than 90 degrees from the reference direction.

For example, as users may not typically rotate their heads more than +−90 degrees with respect to the torso, the first predicted head direction that is more than 90 degrees from reference direction may not be an accurate prediction, and it may be that the user is likely to move their torso in this scenario.

Figure 8:
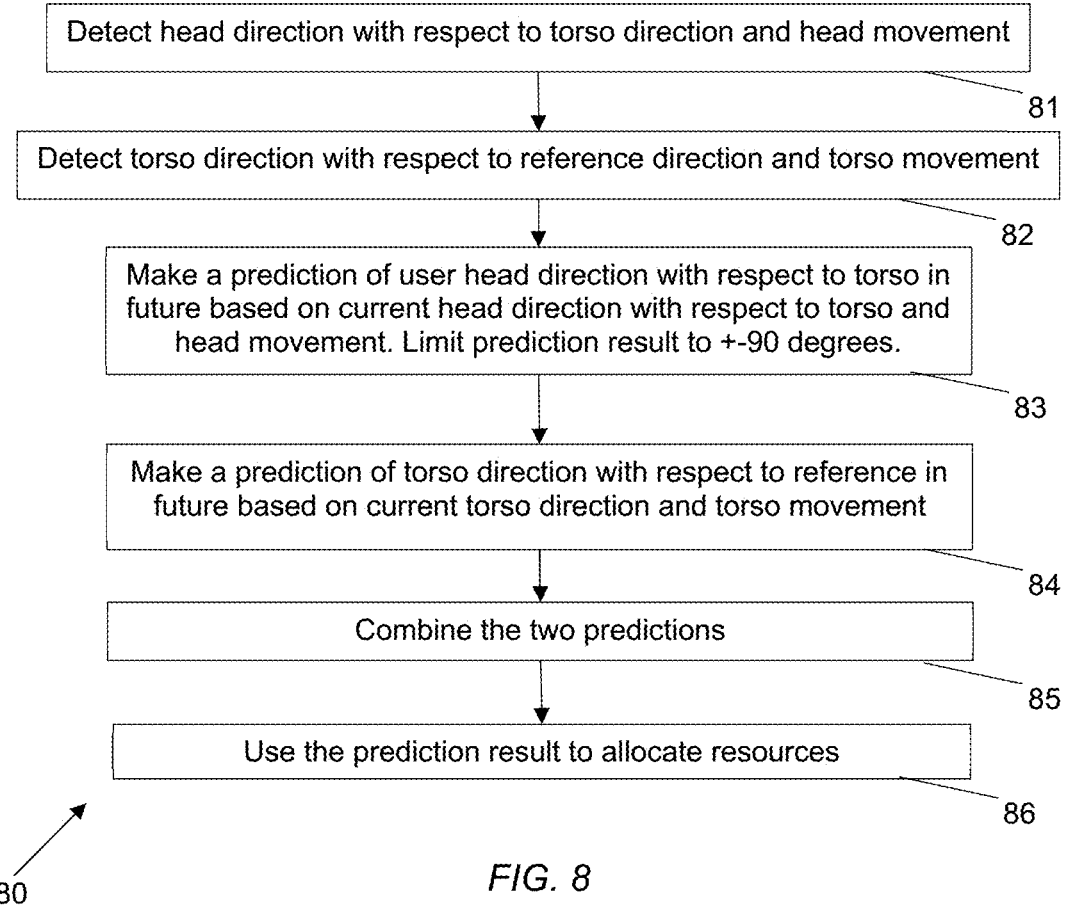

FIG. 8 is a flowchart of an algorithm indicated generally by a reference numeral 80, in accordance with an example embodiment. At operation 81, current head direction is determined of a user with respect to current torso direction (e.g. the torso may be angled differently from the head). Operation 81 may further comprise determining head movement of the user (e.g. velocity and/or degree of head movement for determination of a projected movement). At operation 82, current torso direction of the user is determined with respect to a reference direction (25, 45), and a torso movement is also determined (e.g. velocity and/or degree of torso movement).

Next, at operation 83, a prediction is made of the user's future head direction with respect to the torso based, at least in part, on the current head direction and head movement (e.g. as determined in operation 81) using a first predictor (e.g. linear prediction). The first predictor may be limited to +−90 degrees, as it is unlikely that the user moves their head more than 90 degrees. At operation 84, a prediction is made of the user's future torso direction with reference to the reference direction based, at least in part, on the current torso direction and torso movement (e.g. as determined in operation 82) using a second predictor (e.g. linear prediction).

At operation 85, the prediction of user's future head direction and the prediction of the user's future torso direction may be combined to determine a first predicted future head direction.

At operation 86, the prediction of user's future head direction may then be used for allocating resources of the video being viewed by the user.

Figure 9:
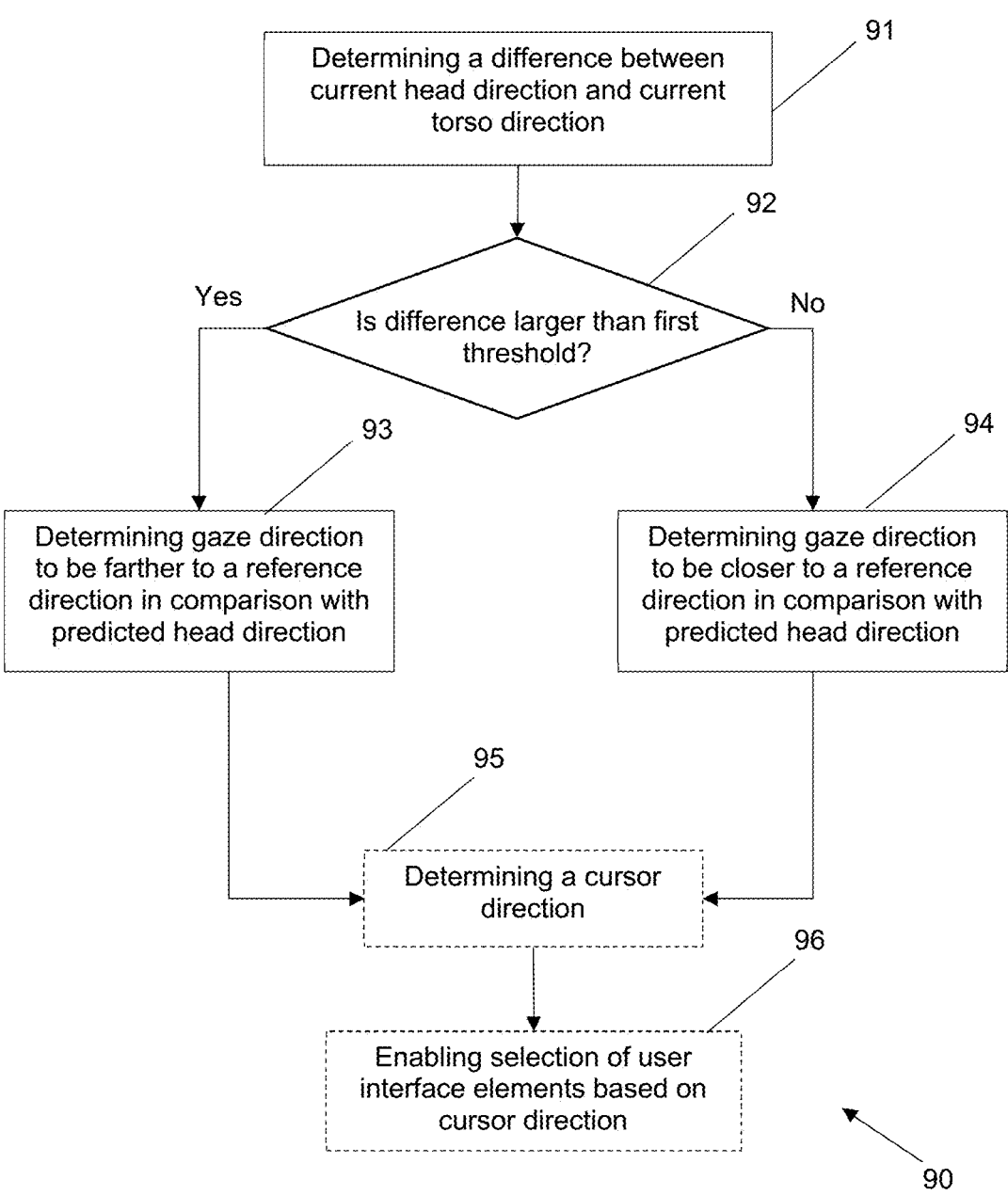

FIG. 9 is a flowchart of an algorithm, indicated generally by a reference numeral 90, in accordance with an example embodiment. At operation 91, a difference between a current head direction (41) and a current torso direction (42) is determined. If it is determined at operation 92 that the difference is larger than a first threshold, operation 93 is performed, and a gaze direction (where the gaze direction relates to the user's gaze) of the user is determined to be farther to a reference direction (45) in comparison to the current head direction (41) at operation 93. Alternatively, if the difference is not larger than the first threshold, the gaze direction is determined to be closer to the reference direction (45) in comparison to the current head direction (41) at operation 94. For example, devices (e.g. head mounted devices) that may not have gaze detection cameras may use the operations of algorithm 90 for determining the user's gaze direction.

At an optional operation 95, a gaze direction may be used for determining a cursor direction. For example, Streaming video such as 180 degree or 360-degree video may have applications that utilize user interface elements, for example, that allow user interaction with the video. The gaze direction may be utilized for determining cursor direction to detect where the user is pointing. Next, optionally at operation 96, selection of user interface elements may be enabled based on the determined cursor direction.

Figure 10:
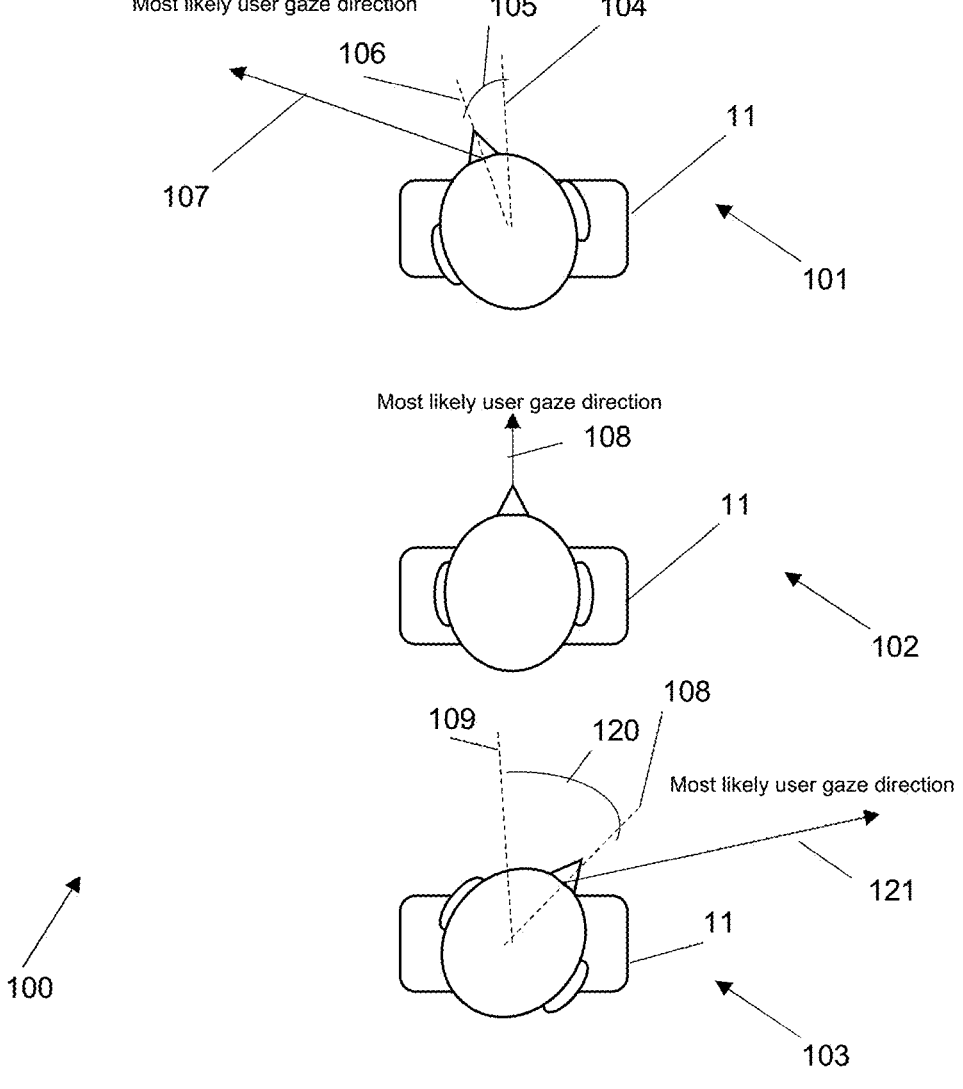
FIGS. 10 and 11 are block diagrams of systems in accordance with example embodiments.

FIG. 10 is a block diagram of a system, indicated generally by the reference numeral 100, in accordance with an example embodiment. FIG. 10 may be viewed in conjunction with FIG. 9 for better understanding.

In a first scenario 101, the user 11 has a head direction 106, and a torso direction 104, where the difference between the head direction and torso direction is difference 105. It may be determined that the difference 105 is higher than the first threshold (operation 92), and hence operation 93 may be performed, and the gaze direction is determined to be gaze direction 107, such that a gaze direction of the user is determined to be farther (in the direction of the difference in head and torso direction) to a reference direction in comparison to the current head direction.

In the second scenario 102, the user has the same head and torso directions. The user is therefore more likely to have a gaze direction 108 same as the current direction.

In the third scenario 103, the user 11 has a head direction 108, and a torso direction 109, where the difference between the head direction and torso direction is difference 120. It may be determined that the difference 120 is higher than the first threshold (operation 92), and hence operation 93 may be performed, and the gaze direction is determined to be gaze direction 121, such that a gaze direction of the user is determined to be farther (in the direction of the difference in head and torso direction) to a reference direction in comparison to the current head direction. In some examples, if point of interest of a user is far to the left or right, they turn their eyes maximally and only turn their heads as much as is needed. Therefore, it is more likely that user gaze direction is towards front when user head and torso are pointing in the same direction whereas it is more likely that user gaze direction is towards left when head is rotated towards left more than the torso and it is more likely that user gaze is towards right when user head is rotated more towards right than the torso. Thus, the most likely user gaze direction can be more accurately estimated using the head and torso relationship rather than just using head direction alone.

Figure 11:
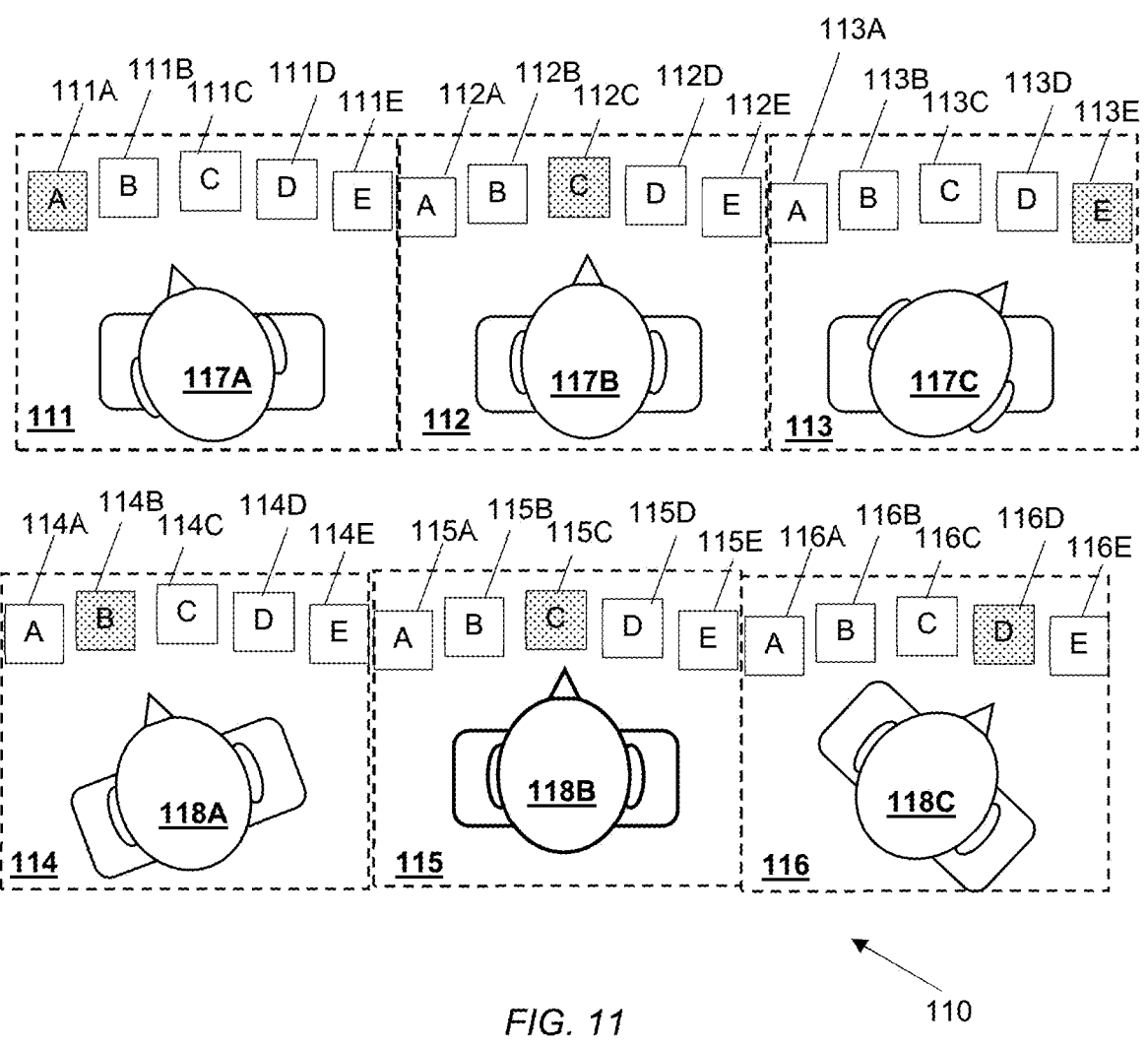

FIG. 11 is a block diagram of a system, indicated generally by the reference numeral 110, in accordance with an example embodiment. System 110 shows scenarios 111 to 116, where in each of the scenarios a user is viewing a plurality of user interface elements, and is shown to have different head-torso directions.

In the scenario 111, the user may view user interface elements 111A-111E. The user is shown in a position 117A, where there is a difference in head direction and torso direction, such that the head direction is more towards left pointing at element 111B while the torso direction is straight pointing at element 111C. As the difference in head and torso directions may be higher than a first threshold, the gaze direction may be considered to be farther from the reference direction (e.g. centre-towards 111C) than the current head direction (towards element 111B). As such the gaze direction is determined to be towards element 111A (farther left).

In the scenario 112, the user may view user interface elements 112A-112E. The user is shown in a position 117B, where the head and torso direction is the same (straight pointing at element 112C. As the difference in head and torso directions may not be higher than a first threshold, the gaze direction may be considered to be same as the head direction the current head direction (towards element 112C). As such the gaze direction is determined to be towards element 112C.

In the scenario 113, the user may view user interface elements 113A-113E. The user is shown in a position 117C, where there is a difference in head direction and torso direction, such that the head direction is more towards right pointing at element 113D while the torso direction is straight pointing at element 113C. As the difference in head and torso directions may be higher than a first threshold, the gaze direction may be considered to be farther from the reference direction (e.g. centre-towards 113C) than the current head direction (towards element 113D). As such the gaze direction is determined to be towards element 113E (farther right).

In all three scenarios 114, 115, and 116, the user is in positions 118 (118A, 118B, 118C) where there is no difference in the head and torso directions. In scenario 114, both the head and torso are directed towards element 114B. Considering that there is no difference between the head and torso directions, The gaze direction is determined to match the head direction (towards 114B). Similarly, in scenario 115, both the head and torso are directed towards element 115C, therefore the gaze direction is determined to match the head direction towards 115C. Similarly, in scenario 116, both the head and torso are directed towards element 116D, therefore the gaze direction is determined to match the head direction towards 116D.

In some examples, one or more of the elements 111A, 112C, 113E, 114B, 115C, and 116D may be determined as being within the cursor direction, and the user may select or interact with said elements based on their gaze direction.

For example, a head mounted device may show the user on a display an UI that has UI elements that may be user head locked and thus rotate with user head or they may be world locked. User may select head locked UI elements by rotating their head with respect to the torso. User may select world locked UI elements by rotating their head.

In some examples, instead of using the difference between head and torso direction, selection of UI elements may be based on determining that the gaze direction is farther away from the head direction when the user moves their head close to a threshold degree (e.g. +−90 degree). This selection may be more natural because user gaze direction is typically more exaggerated when user head is rotated near +−90 degrees with respect to the torso.

In some examples, the determination of gaze direction may be used for applications such as allocating resources in a video stream, estimating what parts of the 360-degree video the user may find interesting, estimating what objects in real world (e.g. in an augmented reality setting) around user finds interesting and controlling a cursor.

For example, in a head mounted devices that do not have a sensor (e.g. a camera) for following user gaze direction, controlling a cursor may be difficult. This is because IMUs (e.g. accelerometers) may have sensor drift and thus the direction of the cursors may drifts away from user frontal direction (natural direction for cursor) over time and moving cursor in areas near display left and right edges is not natural since gaze direction and head direction typically differ there significantly as shown above. Also, head movement and its detection with IMUs may not be highly accurate.

Figure 12:
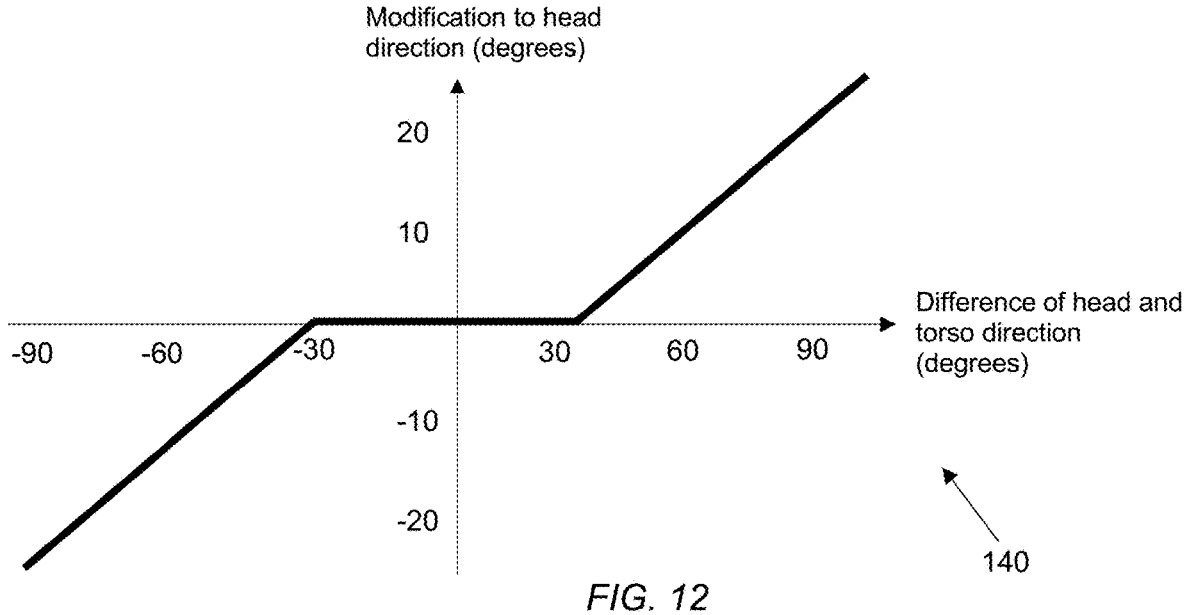
FIGS. 12 and 13 are plots in accordance with example embodiments.
Figure 13:
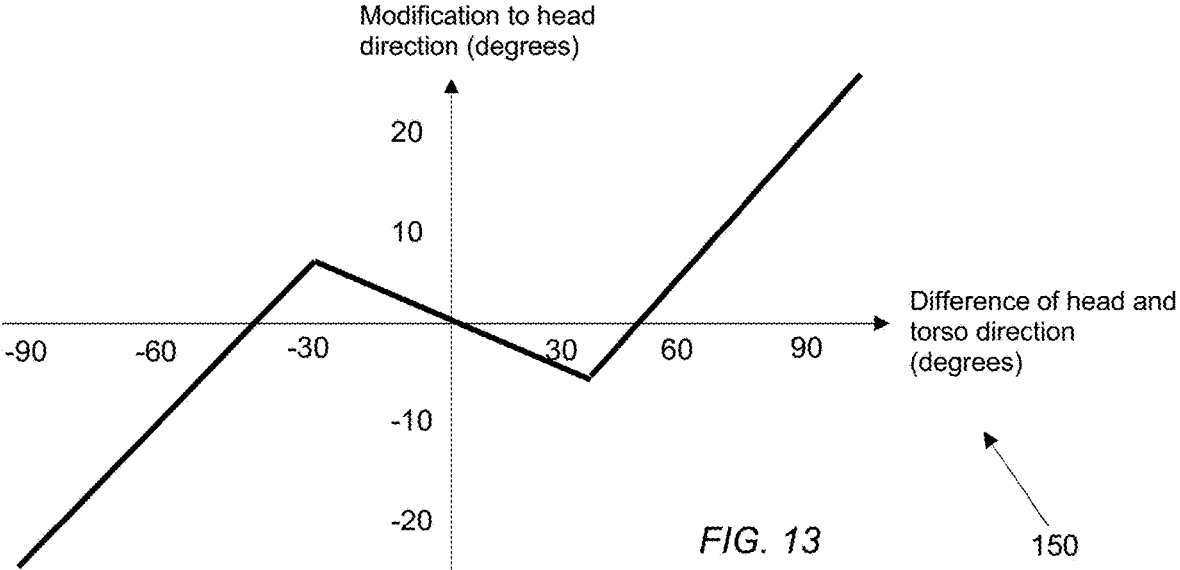

FIGS. 12 and 13 are plots, indicated generally by the reference numeral 140 and 150, respectively in accordance with example embodiments. Each of the plots show a graph for the modification to head direction (y-axis) with respect to difference of head and torso directions (x-axis). All values on the plots are in degrees, and negative values represent one direction (e.g. left from reference direction) and positive values represent another direction (e.g. right from reference direction).

In plot 140, as the difference between the head and torso direction reduces, modification of predicted head direction and/or offset of gaze direction with respect to the head direction increases. The first threshold of difference of head and torso direction may be considered to be +−30 degrees. As such, if the difference is within +−30 degrees, the modification may be zero or the gaze direction may be in the same direction as head direction. Otherwise the modification is higher/gaze direction is further from the 'zero' direction.

In plot 150, as the difference between the head and torso direction reduces, modification of predicted head direction and/or offset of gaze direction with respect to the head direction increases. The first threshold of difference of head and torso direction may be considered to be +−30 degrees. In some embodiments the gaze direction is considered to be closer to a reference direction than the head direction (e.g. cursor moved less than head moves) when head and torso directions are within the +−30 degrees to increase cursor movement accuracy in this area. As such, if the difference is more than +−30 degrees, the modification shows that gaze direction is farther from the within +−30 degrees, the modification may be zero or the gaze direction may be in the same direction as head direction. In some examples, the cursor direction is calculated by modifying the head direction by adding or subtracting a value based on the head and torso direction difference.

Figure 14:
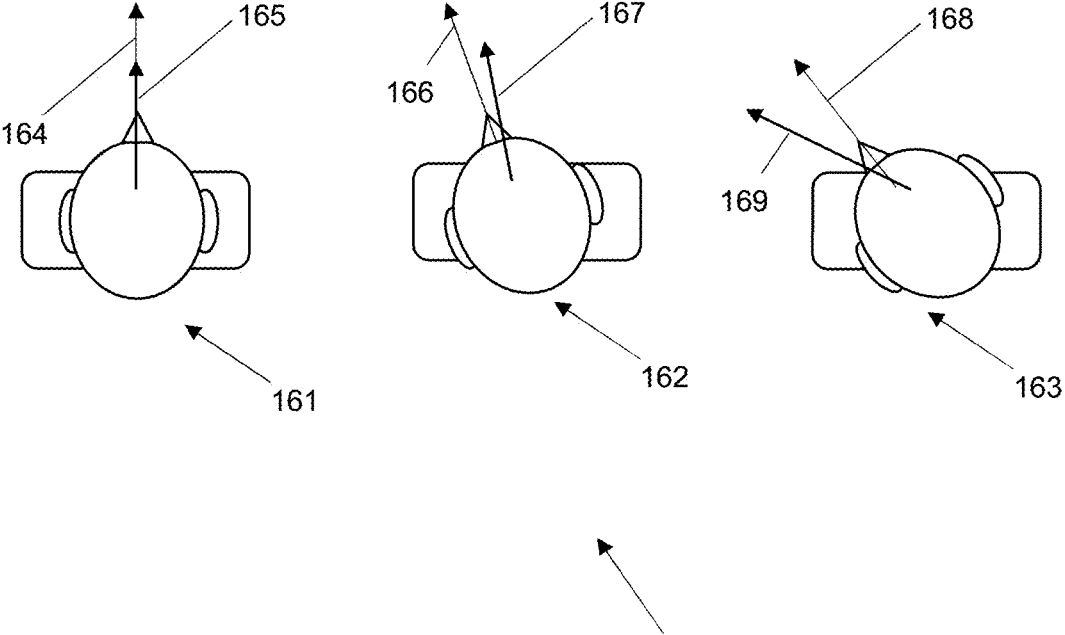
FIG. 14 is a block diagram of a system in accordance with an example embodiment.

FIG. 14 shows a system, indicated generally by the reference numeral 160, in accordance with an example embodiment. Head directions in scenarios 161, 162, and 163, are directions 164, 166, and 168 respectively.

In scenario 161, head direction 164 and torso directions are (nearly) the same. Therefore, cursor direction 165 is determined to be the same as direction 164.

In scenario 162, head direction 166 is such that the head is slightly rotated with respect to torso (e.g. the difference in head and torso direction is lower than the first threshold). Therefore, cursor direction 167 is determined to be somewhat closer to torso direction (or reference diagram) than head direction 166. This may be seen as the cursor rotating slower than head, which may make cursor selection more accurate.

In scenario 163, head direction 168 is such that the head is strongly rotated with respect to torso (e.g. difference in head and torso direction is higher than the first threshold). Therefore, cursor direction 169 is determined to be farther away from the torso direction and/or reference direction compared to the head direction 168. The cursor movement may then follow most likely gaze movement more naturally.

In an example embodiment, a head tracking sensor drift problem may be solved by resetting the sensor when head and torso are aligned for a period of time. In some examples, the drifting problem may be solved here by resetting the cursor direction to zero (front) every time head and torso are in the same direction at least for a minimum time e.g. 3 seconds.

Figure 15:
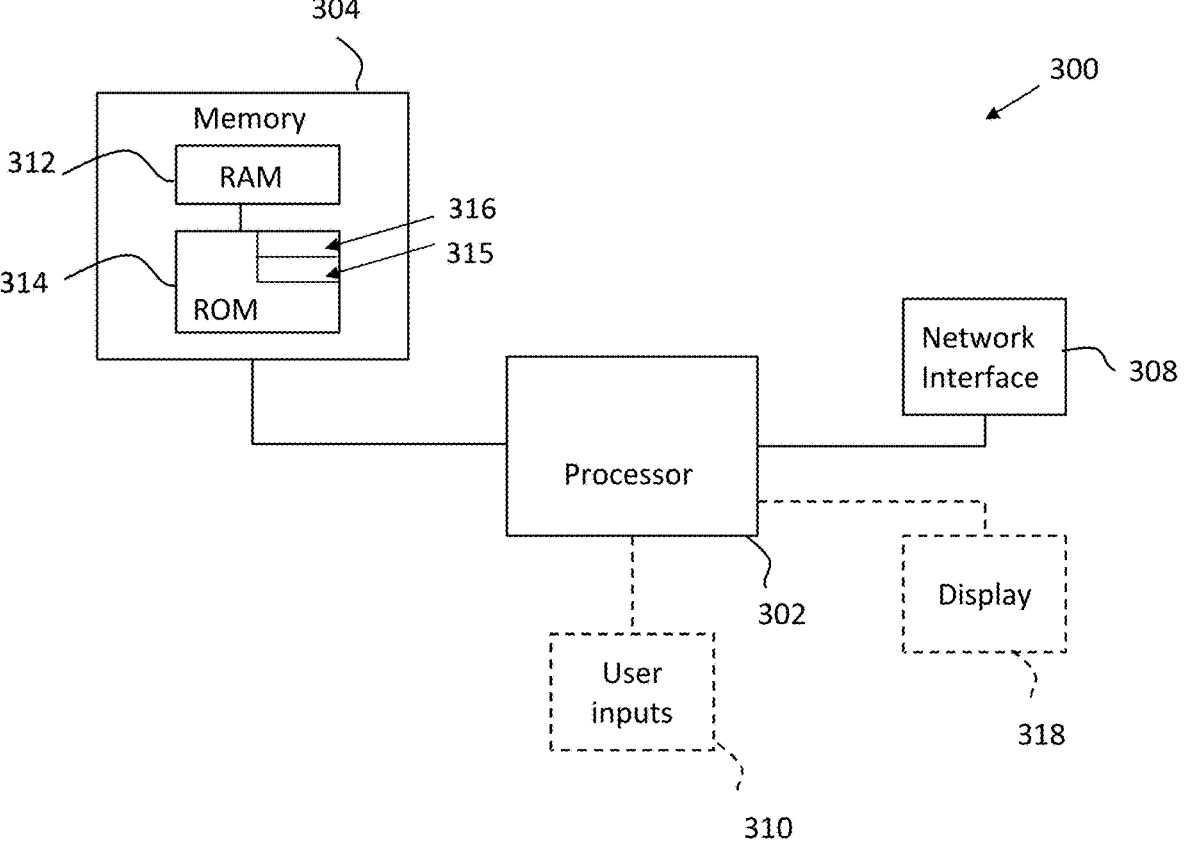
FIG. 15 is a block diagram of components of a system in accordance with an example embodiment.

For completeness, FIG. 15 is a schematic diagram of components of one or more of the example embodiments described previously, which hereafter are referred to generically as processing systems 300. A processing system 300 may have a processor 302, a memory 304 closely coupled to the processor and comprised of a RAM 312 and ROM 314, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid-state drive (SSD). The ROM 314 of the memory 304 stores, amongst other things, an operating system 315 and may store software applications 316. The RAM 312 of the memory 304 is used by the processor 302 for the temporary storage of data. The operating system 315 may contain computer program code which, when executed by the processor implements aspects of the algorithms 30, 50, 70, 80, and/or 90 described above. Note that in the case of small device/apparatus the memory can be most suitable for small size usage i.e. not always hard disk drive (HDD) or solid-state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 16:
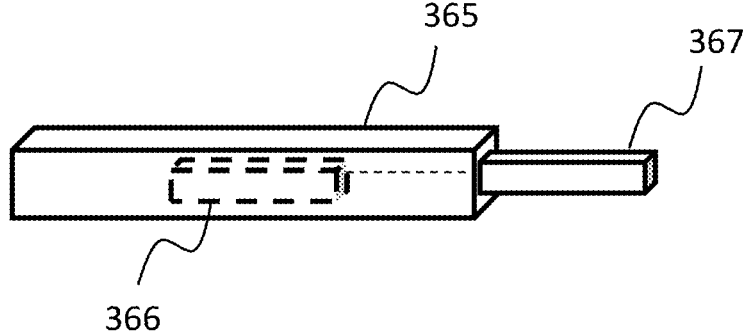
FIG. 16 shows an example of tangible media for storing computer-readable code which when run by a computer may perform methods according to example embodiments described above.

FIG. 16 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor (s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow charts of FIGS. 3, 5, 7, 8, and 9 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus comprising:

at least one processor; and at least one memory storing instructions that, when executed by the at least one processor, cause the apparatus at least to:

determine a change in head direction of a user within a first predefined time period;

determine a first predicted head direction based on said change in head direction;

determine a change in torso direction of a user within a second predefined time period;

modify the first predicted head direction to a second predicted head direction based, at least in part, on the change in torso direction;

determine that the first predicted head direction is more than ninety degrees from a reference direction; and based on determining that the first predicted head direction is more than ninety degrees from the reference direction, determine a first predicted torso direction based on the change in torso direction, wherein the second predicted head direction is determined further based on a combination of the first predicted head direction and the first predicted torso direction.

2. An apparatus as claimed in claim 1, wherein the first predicted head direction is modified towards the direction of the change in torso direction for determining the second predicted head direction.

3. An apparatus as claimed in claim 1, wherein the apparatus is further caused to:

allocate resources of a video for transmission via a network based, at least in part, on the second predicted head direction, wherein the resources comprise at least one of a bitrate or a resolution of the video.

4. An apparatus as claimed in claim 3, wherein the allocating comprises allocating a higher amount of resources for transmission of one or more parts of the video corresponding to the second predicted head direction relative to an amount of resources for transmission of one or more other parts of the video.

5. An apparatus as claimed in claim 3, wherein the video comprises at least one of an immersive video, a spherical video, a virtual reality video, a 360-degree video, or a 180-degree video.

6. An apparatus as claimed in claim 1, wherein the modifying is performed based on a determination of whether the change in torso direction is higher than a first threshold.

7. An apparatus as claimed in claim 1, wherein at least one of the change in head direction or the change in torso direction is determined using one or more inertial measurement units.

8. An apparatus as claimed in claim 1, wherein the second predicted head direction is further determined based on at least one of movement(s) of the user's leg(s) or movement (s) of the user's hand(s).

9. An apparatus as claimed in claim 1, wherein the apparatus is further caused to:

determine a difference between a current head direction and a current torso direction;

based on said difference being larger than a first threshold, determine a gaze direction to be farther to a reference direction in comparison to the current head direction; and based on said difference being smaller than the first threshold, determine the gaze direction to be closer to the reference direction in comparison to the current head direction.

10. An apparatus as claimed in claim 9, wherein the apparatus is further caused to:

determine a cursor direction based, at least in part, on the gaze direction.

11. An apparatus as claimed in claim 10, wherein the apparatus is further caused to:

enable selection of user interface elements based, at least in part, on the cursor direction.

12. A method comprising:

determining a change in head direction of a user within a first predefined time period;

determining a first predicted head direction based on said change in head direction;

determining a change in torso direction of a user within a second predefined time period;

modifying the first predicted head direction to a second predicted head direction based, at least in part, on the change in torso direction;

determining that the first predicted head direction is more than ninety degrees from a reference direction; and based on determining that the first predicted head direction is more than ninety degrees from the reference direction, determining a first predicted torso direction based on the change in torso direction, wherein the second predicted head direction is determined further based on a combination of the first predicted head direction and the first predicted torso direction.

13. The method of claim 12, wherein the first predicted head direction is modified towards the direction of the change in torso direction for determining the second predicted head direction.

14. The method of claim 12, further comprising:

allocating resources of a video for transmission via a network based, at least in part, on the second predicted head direction, wherein the resources comprise at least one of a bitrate or a resolution of the video.

15. The method of claim 14, wherein the allocating comprises allocating a higher amount of resources for transmission of one or more parts of the video corresponding to the second predicted head direction relative to an amount of resources for transmission of one or more other parts of the video.

16. The method of claim 14, wherein the video comprises at least one of an immersive video, a spherical video, a virtual reality video, a 360-degree video, or a 180-degree video.

17. The method of claim 12, wherein the modifying is performed based on a determination that the change in torso direction is higher than a first threshold.

18. A non-transitory computer readable medium comprising program instructions that, when executed by an apparatus, cause the apparatus to perform at least the following:

determining a change in head direction of a user within a first predefined time period;

determining a first predicted head direction based on said change in head direction;

determining a change in torso direction of a user within a second predefined time period;

modifying the first predicted head direction to a second predicted head direction based, at least in part, on the change in torso direction;

determining that the first predicted head direction is more than ninety degrees from a reference direction; and based on determining that the first predicted head direction is more than ninety degrees from the reference direction, determining a first predicted torso direction based on the change in torso direction, wherein the second predicted head direction is determined further based on a combination of the first predicted head direction and the first predicted torso direction.

\* \* \* \* \*